US008134313B2

(12) United States Patent
Zipp

(10) Patent No.: US 8,134,313 B2
(45) Date of Patent: Mar. 13, 2012

(54) DEVICE AND METHOD FOR CLOSING, OR OPENING AND CLOSING, AT LEAST ONE DRAWER, FLAP, DOOR, OR THE LIKE

(75) Inventor: Juergen Zipp, Braunfels (DE)

(73) Assignees: Kuester Automotive Door Systems GmbH (DE), part interest; Grass GmbH (AT), part interest ( * ) Notice: Subject to any disclaimer, the term of this patent is extended or adjusted under 35 U.S.C. 154(b) by 1007 days.

(21) Appl. No.: 12/083,379

(22) PCT Filed: Oct. 11, 2006

(86) PCT No.: PCT/EP2006/009797

§ 371 (c)(1),
(2), (4) Date: Apr. 10, 2008

(87) PCT Pub. No.: WO2007/042266

PCT Pub. Date: Apr. 19, 2007

(65) Prior Publication Data

US 2009/0199484 A1 Aug. 13, 2009

(30) Foreign Application Priority Data

Oct. 13, 2005 (DE) ......................... 10 2005 049 488

(51) Int. Cl.
*E05F 15/00* (2006.01)
*H02P 7/00* (2006.01)

(52) U.S. Cl. ............................ 318/282; 49/139; 49/360

(58) Field of Classification Search .................. 318/266, 318/282, 286, 461, 466, 468, 469, 470; 49/26-28, 49/118, 139, 280, 334, 360
See application file for complete search history.

(56) References Cited

U.S. PATENT DOCUMENTS

| | | | | |
|---|---|---|---|---|
| 5,144,769 | A * | 9/1992 | Koura | 49/360 |
| 5,278,480 | A * | 1/1994 | Murray | 318/626 |
| 5,689,160 | A * | 11/1997 | Shigematsu et al. | 318/281 |
| 6,134,836 | A * | 10/2000 | Kawanobe et al. | 49/360 |
| 6,226,925 | B1 * | 5/2001 | Shimura et al. | 49/360 |

(Continued)

FOREIGN PATENT DOCUMENTS

DE 198 10 077 A1 9/1998

(Continued)

*Primary Examiner* — Eduardo Colon
(74) *Attorney, Agent, or Firm* — Charles P. Boukus, Jr.

(57) ABSTRACT

Disclosed is a device for moving and/or opening and closing at least one drawer, flap, door, or similar. The device comprises at least one-drive unit (9) that is effectively connected to the drawer, flap, door, or similar, at least one control and regulation unit (1) for the at least one drive unit (9), and at least one sensor unit (2) for detecting the direction of rotation and/or the number of rotations of the drive shaft of the drive unit (9), the number and/or the direction of rotation being fed to the control and regulation unit (1). A timer (5) is provided that starts a given interval when rotations of the drive shaft are detected which are not generated by the drive unit (9) while at least one comparing unit (3,4) is provided in which a lower threshold value can be stored for the rotations or partial rotations of the drive shaft detected by the sensor unit (2) within the given interval. The drive unit (9) can be activated so as to open or close the at least one drawer, flap, door, or similar when the lower threshold is exceeded.

21 Claims, 2 Drawing Sheets

U.S. PATENT DOCUMENTS 7,073,291 B2 * 7/2006 Kawanobe et al. ............... 49/26
7,205,734 B2 * 4/2007 Kidokoro ...................... 318/268
7,354,100 B2 * 4/2008 Yokomori et al. ............ 296/155
7,619,381 B2 * 11/2009 Kawai et al. .................. 318/283
7,690,156 B2 * 4/2010 Imai et al. ....................... 49/360
7,701,157 B2 * 4/2010 Shimomura et al. .......... 318/265
7,828,375 B2 * 11/2010 Honjo et al. ............. 296/216.03
2004/0189046 A1 9/2004 Kawanobe

FOREIGN PATENT DOCUMENTS

EP 1 323 363 A1 7/2003
EP 1 374 732 A1 1/2004

* cited by examiner

DEVICE AND METHOD FOR CLOSING, OR OPENING AND CLOSING, AT LEAST ONE DRAWER, FLAP, DOOR, OR THE LIKE

BACKGROUND OF THE INVENTION

1. Field of the Invention

The invention relates to a device for displacing and/or for opening and closing of at least one drawer, one flap, one door or the like. The invention furthermore relates to a method for displacing and/or for opening and closing of at least one drawer, one flap, one door or the like.

2. Description of Related Art

An aid for starting the pushing of a drawer is known from EP 1 347 732 A1. This pushing aid has a drive unit and a control and regulating device for controlling and regulating the at least one drive unit. Furthermore, a sensor unit in the form of an acceleration measuring unit is provided for detecting the direction of rotation and/or the number of revolutions of the driveshaft. The number of revolutions detected by this sensor unit and the direction of rotation of the driveshaft are supplied to the control and regulating device. In this case the drawer is in a direct functional connection with the driveshaft of the drive mechanism. As soon as an acceleration, for example because of a manual actuation of the drawer, is detected by the acceleration measuring arrangement of this device, the drive is activated for aiding the manual actuation.

In connection with this prior art it is necessary to determine the force in the form of the acceleration applied to the drawer by the manual actuation. However, this involves a large outlay, because the acceleration is a vectorial value, which is moreover defined by the second temporal derivation of the traveled path. It is therefore necessary to determine the direction, as well as the amount, of this time-dependent vector.

SUMMARY OF THE INVENTION

It is therefore the object of the invention to further develop a device for displacing and/or for opening and closing of at least one drawer, one flap, one door or the like, or a method for displacing and/or for opening and closing of at least one drawer, one flap, one door or the like, to the effect that the operation of the device, or the method, are simplified.

By means of the step of providing a timer which, when revolutions of the driveshaft are detected which had not been generated by the drive mechanism, starts a predetermined time interval in which, based on the number of revolutions of the driveshaft not generated by the drive mechanism in the time interval provided, an angular speed is determined, by means of which the drive mechanism can be activated following the end of the provided time interval, it is achieved that the drive mechanism is started solely on the basis of the detected revolutions of the driveshaft. No elaborate acceleration measurements are required here.

As soon as a movement of the driveshaft is detected by the sensor unit, this is passed on to the control and regulating device which, in turn, causes the timer to start a time interval. A constant angular velocity is determined by the control and regulating device for the driveshaft on the basis of the number of the revolutions detected by the sensor unit during the time interval and added together by the control and regulating unit. The drive mechanism is thereupon started, and its driveshaft is rotated by a motor at the angular velocity previously determined. In this way the at least one drawer, one flap, one door or the like, are moved out of their respective position at a constant velocity.

If, for example, the at least one drawer, one flap, one door or the like, are in a closed position, the opening movement provided by a motor is initiated by the drive mechanism. If the at least one drawer, one flap, one door or the like, are in the maximum opened position, the closing movement is initiated by the drive mechanism. It is of course also possible to start an opening or closing movement of the at least one drawer, one flap, one door or the like, from any arbitrary intermediate position on the basis of the revolutions of the driveshaft detected during the time interval.

The angular velocity of the driveshaft is maintained when the driveshaft is actuated by a motor in order to avoid possible surprising effects, or even the danger of injury, when opening, closing or moving the at least one drawer, one flap, one door or the like, which might occur, in particular at high angular velocities of the driveshaft, and therefore in the course of the rapid opening or closing of the at least one drawer, one flap, one door or the like.

In accordance with a first advantageous embodiment of the invention at least one comparison arrangement is provided, in which a lower threshold value of the revolutions of the driveshaft detected by the sensor unit during the predetermined time interval can be deposited, wherein in case this lower threshold value falls below the lower limit, the drive mechanism can be activated and the driveshaft can be rotated for moving the at least one drawer, one flap, one door or the like into its original initial position by the amount of the revolutions detected in the predetermined time interval. By means of this step it is advantageously achieved that the driveshaft, and therefore also the at least one drawer, one flap, one door or the like, are moved back into their original initial position they had taken up prior to the start of the time interval. Extensive maintenance work for readjusting the at least one drawer, one flap, one door or the like can therefore be omitted.

The embodiment of the sensor unit for detecting a change in the direction of rotation of the driveshaft taking place in the time interval aims in the same direction. Because of this it is prevented that shocks, because of which the driveshaft first moves in the one direction of rotation and then in the other direction of rotation, lead to the unwanted opening or closing of the drawer. The change in the direction of rotation of the driveshaft is detected by the sensor unit and is passed on to the control and regulating device, so that no summing-up of the individual pulses of the sensor unit as rotations of the driveshaft occurs.

It is provided in accordance with another advantageous embodiment that the at least one comparison arrangement is designed for storing a table of values and/or a proportional connection regarding the revolutions of the driveshaft detected in the predetermined time interval, and of the revolutions of the driveshaft which are to be created on the part of the drive mechanism. It is determined by means of this step on the basis of the rotations of the driveshaft detected during the time interval how many rotations of the driveshaft are to be generated by the motor of the drive mechanism. It is determined by means of this how far the at least one drawer, one flap, one door or the like is to be moved.

In this case the at least one comparison arrangement is advantageously designed for forming an upper threshold value of the revolutions detected in the predetermined time interval. It is achieved by means of this that the driveshaft of the drive mechanism can be moved into its end positions which correspond to the open or closed position of the at least one drawer, one flap, one door or the like, if the revolutions of the driveshaft detected during the time interval exceed this upper threshold value.

It is also assured by the recognition of the direction of rotation by the sensor unit that it is detected whether closing or opening of the at least one drawer, one flap, one door or the like is to be performed.

In this connection it has been shown to be advantageous that at the end of the time interval the timer is designed to start a further time interval. It is possible in a simple manner by means of this step to check whether further rpm pulses can be measured. In particular, if the detected revolutions of the driveshaft have fallen below the lower threshold value, it is possible in a simple manner to check whether the driveshaft is rotated further. If this is not the case, the driveshaft is moved into its end position corresponding to the closed position of the at least one drawer, one flap, one door or the like. In the other case, the time interval is again started until it is possible to detect further rotations of the driveshaft by means of the sensor unit until the lower threshold value is exceeded. It is assured in this way that the driveshaft is moved by the motor over a reasonable number of rotations, for example in order to be able to fill or empty the drawer.

In accordance with a further advantageous embodiment of the invention, the sensor unit is designed in the form of a Hall sensor with at least one corresponding magnet. By means of this it is assured in a simple manner that the revolutions of the driveshaft can be detected as signals from the Hall sensor and can be passed on to the control and regulating device. The individual signals are added up in the control and regulating unit, so that the number of revolutions of the driveshaft during the time interval can be determined.

In this case the magnet is advantageously designed as a magnetic wheel arranged on the driveshaft. Not only is the adding-up of the individual signals to the number of revolutions of the driveshaft possible by means of this step, but also the determination of the direction of rotation of the driveshaft. In order to be able to drive the driveshaft at the end of the time interval, the drive mechanism includes an electric motor. Such electric motors are available in compact embodiments and assure the problem-free driving of the driveshaft, along with low energy use.

In accordance with a further advantageous embodiment of the invention, the control and regulating device has a computing unit, by means of which the revolutions of the driveshaft detected during the predetermined time interval can be added up to the number of revolutions of the driveshaft during the time interval. Such computing units in the form of microprocessors or micro-controllers are also of small size and can be obtained at advantageous cost, and also assure problem-free operations along with low energy use.

Values regarding the revolutions of the driveshaft, which correspond to the end positions, or predefined intermediate positions of the at least one drawer, one flap, one door or the like, can be advantageously deposited in the at least one comparison arrangement. Because of this the control and regulating device can compare the revolutions of the driveshaft detected during the time interval with the stored values, and the end or intermediate positions can be approached without problems.

In accordance with a particularly advantageous embodiment of the invention, that position is defined as the end position for the closed state of the at least one drawer, one flap, one door or the like, in which the driveshaft can be rotated in either direction. The end position is here detected by the control and regulating device and, in case of the detection of rotations of the driveshaft within the predetermined time interval, a rotation of the driveshaft from this end position of the driveshaft, which defines the closed state of the at least one drawer, one flap, one door or the like, is made possible. It is of course also possible to define a position as the maximum open position of at least one drawer, one flap, one door or the like, in which the driveshaft can be moved in either direction. The revolutions of the driveshaft occurring in the predetermined time interval then lead to the closing of the at least one drawer, one flap, one door or the like.

In another advantageous embodiment of the invention the timer is designed not to generate time intervals when the drive mechanism is activated. By means of this, erroneous calculations of positions and angular velocities of the driveshaft by the control and regulating device are avoided. Such a calculation only takes place if the drive mechanism has not yet been activated, or the drive mechanism is only activated after such a calculation.

The object in accordance with the method of the invention is attained in that an angular velocity is determined from the number of revolutions of the driveshaft not generated by the drive mechanism within a predetermined time interval, with which the driveshaft of the drive mechanism activated at the end of the time interval is rotated. It is assured by means of this step that, at the end of the time interval, the driveshaft of the drive mechanism is driven at a constant angular velocity by the drive mechanism, provided that it had been possible to detect revolutions of the driveshaft within the time interval. Elaborate acceleration measurements are not required, since the mere detection of the movement of the driveshaft within the time interval causes a motor-driven movement of the driveshaft. It is advantageous here that the driveshaft is rotated at a constant angular velocity. Because of this, when opening a drawer, for example, it is also opened at a constant speed. Thus the speed is maintained, so that surprise effects, or even the danger of confusion because of an increased displacement speed of the drawer, or speed of rotation of the driveshaft, are avoided.

In accordance with a first advantageous embodiment of the method in accordance with the invention, the number of revolutions of the driveshaft not generated by the drive mechanism during a predetermined time interval is compared with a stored lower threshold value. In this case the drive mechanism is activated when the lower threshold value is downwardly exceeded and the driveshaft is rotated into its original initial position for moving the at least one drawer, one flap, one door or the like by the number of revolutions not generated by the drive mechanism during the predetermined time interval. It is assured by means of this that movements of the driveshaft created, for example, by shocks, do not lead to rotating movements of the driveshaft caused by the drive mechanism, which open or close the at least one drawer, one flap, one door or the like. Instead, the driveshaft, and therefore also the at least one drawer, one flap, one door or the like, are moved back into their original initial position. Later maintenance work for readjusting are thus prevented, since the initial position is always taken up again.

The step, in which a change in the direction of the angle of rotation of the driveshaft, which has taken place during the time interval, is detected, is also aimed in the same direction. In this way shocks, which alternatingly turn the driveshaft into one or the other direction of rotation, do no lead to erroneous interpretations causing the activation of the drive mechanism. In accordance with a further embodiment of the method in accordance with the invention the number of revolutions of the driveshaft, for which the drive mechanism is to be activated, is calculated from the number of rotations detected during the predetermined time interval. Therefore the rotations of the driveshaft detected during the predetermined time interval are a measure of the number of rotations of the driveshaft to be generated by the drive mechanism. The at least one drawer, one flap, one door or the like is therefore displaced by a predetermined value corresponding to the number of revolutions of the driveshaft detected during the time interval. This can be an opening or a closing, depending on the direction in which the driveshaft was moved during the time interval.

The number of revolutions detected during the predetermined time interval is advantageously compared with an upper threshold value. As soon as this threshold value has been exceeded, a movement of the driveshaft into the respective end position occurs, depending on the direction of rotation of the driveshaft. This means that in case of exceeding this threshold value the at least one drawer, one flap, one door or the like, is moved into its closed, or maximally open position, by the drive mechanism.

It has furthermore been shown to be advantageous to start a further time interval at the end of a predetermined time interval. It is assured by means of this, in particular if the lower threshold value has not been reached, that the rotating movement of the driveshaft is continued during a further time interval. If no rotating movement takes place during this time interval, the driveshaft, and therefore also the at least one drawer, one flap, one door or the like, is moved back into its original initial position prior to the start of the first time interval.

Further aims, advantages, characteristics and employment possibilities of the instant invention ensue from the following description of an exemplary embodiment by means of the drawings. Here, all characteristics described and/or shown in the drawings constitute the subject of the instant invention by themselves or in any arbitrary sensible combination, also independently of their combination in the claims or the dependencies thereof.

DETAILED DESCRIPTION OF THE INVENTION

Figure 1:
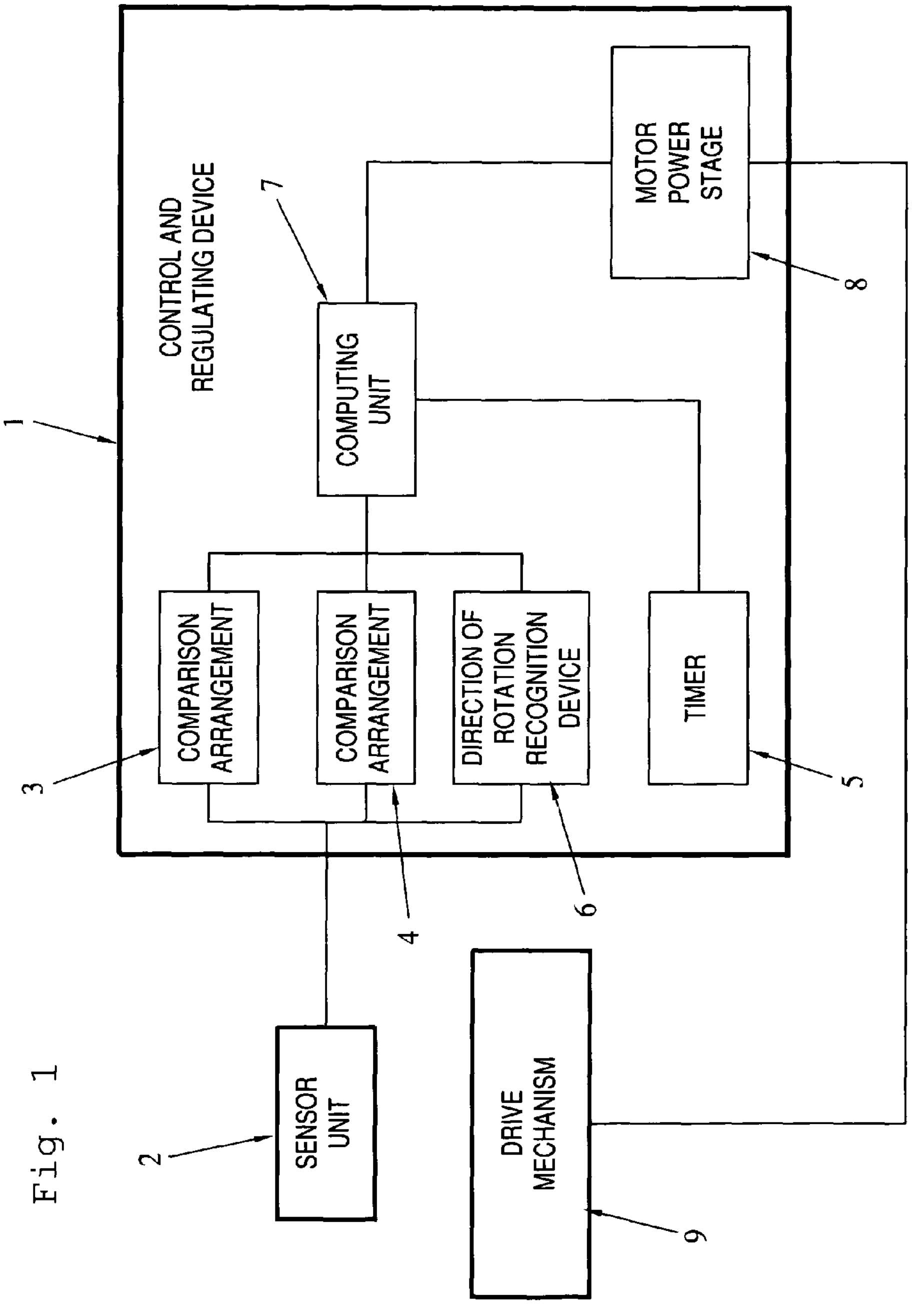
FIG. 1 is a schematic representation of an exemplary embodiment of a device in accordance with the invention.

The exemplary embodiment of FIG. 1 substantially consists of a control and regulating device 1, a sensor unit 2, as well as a drive mechanism 9. In the instant case the control and regulating device 1 has two comparison arrangements 3, 4, a direction of rotation recognition device 6, a timer 5, a computing unit 7, as well as a motor power stage 8 for the drive mechanism 9.

The drive mechanism 9 is provided with a (non-represented) driveshaft, which does not have self-locking. This means, that the driveshaft can be rotated manually, or by an external application of force. In this case the driveshaft is in an active connection with a drawer 10 represented in FIG. 2. The manual opening or closing of the drawer 10 here causes a rotation of the driveshaft of the drive mechanism 9 because of this active connection.

A rotating movement of the driveshaft caused by the manual movement of the drawer 10 is detected by the sensor unit 2 and is passed on to the control and regulating device 1. As soon as the control and regulating device 1 has detected a rotation of the driveshaft caused by a manual displacement of the drawer 10, a time interval is started by means of the timer 5. The revolutions of the driveshaft caused by the manual displacement during this time interval are detected by means of the sensor unit 2 and are passed on to the regulating and control unit 1, where they are added up with the aid of the computing unit 7. If the sum of these revolutions detected during this time interval is less than a lower threshold value deposited in the comparison arrangement 3, the drive mechanism 9 is activated via the motor power stage 8 of the control unit 1 and the drawer is moved back into its original position prior to starting the time interval.

An alternative possibility consists in starting a fresh time interval by means of the timer following the passage of the time interval in order to check whether further rotations of the driveshaft can be detected with the aid of the sensor unit 2. If this is not the case, at the end of the new time interval the drawer is moved into its original position prior to the start of the first time interval. If rotations of the driveshaft are again detected during the second time interval, a new time interval is started as long as further revolutions of the driveshaft can be detected. If in the course of this a threshold value for the revolutions, which assures that the drawer opens at least in one predetermined sensible way for being able to fill or empty the drawer, is exceeded, the drive mechanism is activated and the drawer is correspondingly moved.

An upper threshold value is deposited in the comparison arrangement 4. If the number of revolutions of the driveshaft detected during the time interval is greater than this upper threshold value, an activation of the drive mechanism takes place following the passage of the time window in which the drawer, provided it is in its closed position, is moved into its maximally open position. If the drawer is in its maximally open position, the drawer is closed by the motor drive after the passage of the time window.

Depending on the direction of rotation of the driveshaft, which can be determined by the direction of rotation recognition device 6, closing or maximum opening of the drawer 10 can be caused by the drive mechanism 9 for every intermediate position, if the upper threshold value has been exceeded in the time interval.

In this case the direction of rotation recognition device 6 works together with the sensor unit 2, wherein the sensor unit 2 is realized by a (non-represented) Hall sensor and a magnetic wheel (also not represented) attached to the driveshaft. It is possible in a simple way to determine the direction of rotation of the driveshaft by means of such an arrangement, because the magnetic wheel initiates several signals in the Hall sensor in the course of a rotation of the driveshaft.

Figure 2:
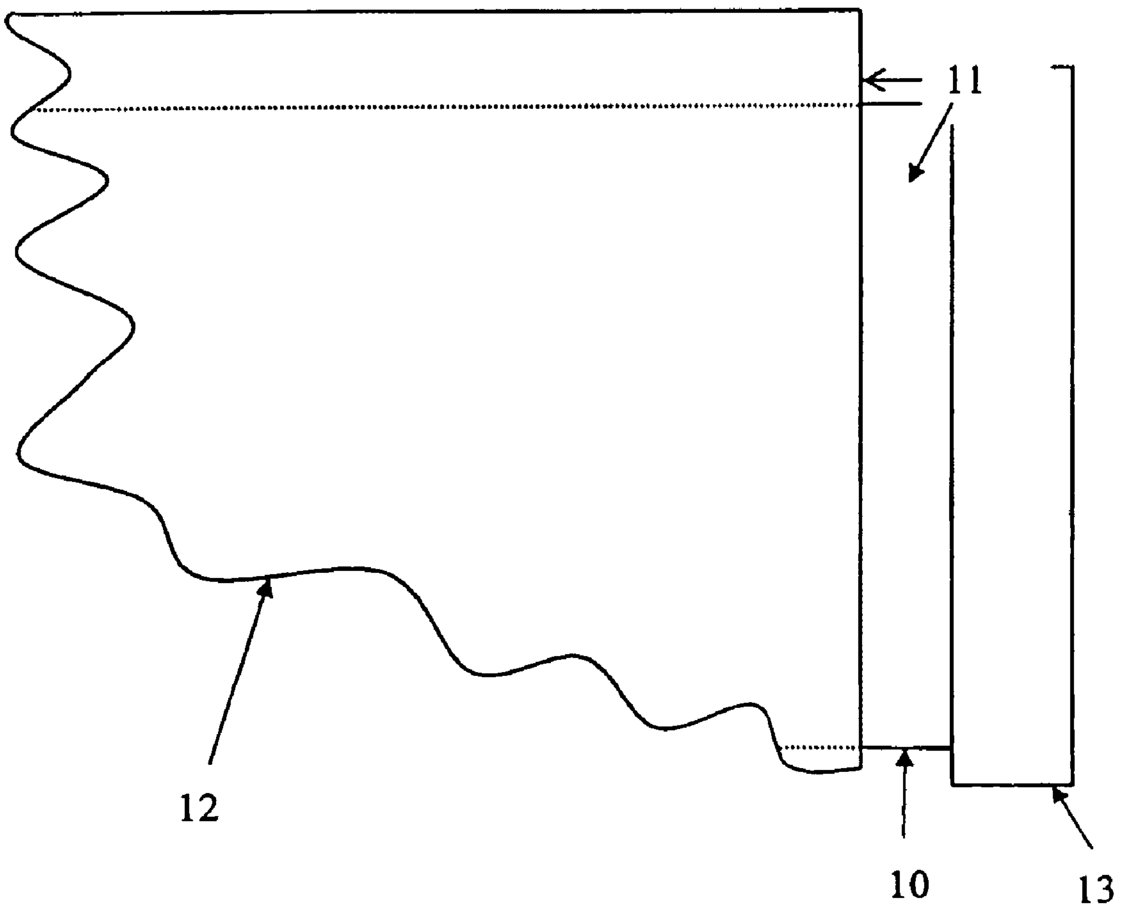
FIG. 2 shows a drawer, sketched by means of portions thereof, which can be displaced in its guidance element by means of a device in accordance with the invention.

The portion of a drawer 10 represented in FIG. 2 represents it in the closed position. Here, the drawer 10 is seated in the body 12 so that it can be pushed back and forth. The drawer 10 furthermore has a front 13 without a pull. A gap 11 is formed between the body 12 and the front 13 in this closed position. This gap 11 is used for being able to open the drawer 10 in spite of its front 13 not having a pull. For this purpose, the front 13 is pushed by the user in the direction of the body 12. The gap 11 is reduced because of this and, because of the active connection between the drawer and the driveshaft of the drive mechanism 9, the rotations of the driveshaft generated in this way are detected by the sensor unit 2. The sensor unit 2 passes on the signals to the control and regulating device 1, in which they are added up into revolutions of the driveshaft, and wherein the control and regulating device 1 interprets this action as a command for opening the drawer 10. Therefore the drive mechanism is activated after the passage of the time window, which had been started by the timer following the detection of the first rotation of the driveshaft by the sensor unit 2. In this case the driveshaft is rotated by means of the motor opposite the rotation of the driveshaft generated by operating the drawer.

The further operation, or the further method regarding such a drawer 10 with a front 3 without a pull occurs analogously to the previously described manner.

LIST OF REFERENCE NUMERALS

1 Control and regulating device
2 Sensor unit
3 Comparison arrangement
4 Comparison arrangement
5 Timer
6 Direction of rotation recognition device
7 Computing unit
8 Motor power stage
9 Drive mechanism
10 Drawer
11 Gap
12 Body
13 Front without a pull

The invention claimed is:

1. A device for displacing and/or for opening and closing of at least one drawer or one flap, having at least one drive unit (9), and having at least one control and regulating device (1) for the at least one drive unit (9), and having at least one sensor unit (2) for detecting the direction of rotation and/or the number of rotations of the driveshaft of the drive mechanism (9), wherein the number of the detected revolutions and/or the direction of rotation of the driveshaft can be supplied to the control and regulating device (1), and wherein the at least one drawer or one flap, is in an active connection with the driveshaft, characterized in that a timer (5) is provided which, in case of the detection of rotations of the driveshaft not generated by the drive mechanism (9), starts a predetermined time interval, and that at least one comparison arrangement (3, 4) is provided, in which a lower threshold value for the revolutions, or partial revolutions of the driveshaft within the predetermined time interval can be deposited, wherein, when the lower threshold value is exceeded, the drive mechanism (9) can be activated for opening or closing the at least one drawer or one flap, wherein the drive mechanism (9) is not self-locking.

2. The device in accordance with claim 1, characterized in that an angular velocity is determined on the basis of the revolutions, or partial revolutions, of the driveshaft not generated during the predetermine time interval by the drive mechanism (9), with which the drive mechanism can be activated at the end of the predetermined time interval.

3. The device in accordance with claim 1, characterized in that a lower threshold value of the revolutions detected by the sensor unit (2) in the predetermined time interval can be deposited in the at least one comparison arrangement (3, 4) wherein, in case this lower threshold value is downwardly exceeded, the drive mechanism (9) can be activated and can be moved into its original initial position by the amount of revolutions detected during the predetermined time interval for moving the at least one drawer or one flap.

4. The device in accordance with claim 1, characterized in that the sensor unit is embodied to detect a change in the direction of rotation of the driveshaft, which took place during the time interval.

5. The device in accordance with claim 1, characterized in that the at least one comparison arrangement (3, 4) is embodied for storing a table of values and/or a proportional connection between the revolutions of the driveshaft detected during the predetermined time interval and the revolutions of the driveshaft which must be generated on the driving side.

6. The device in accordance with claim 1, characterized in that the at least one comparison arrangement (3, 4) is embodied for storing an upper threshold value of the revolutions detected during the predetermined time interval.

7. The device in accordance with claim 1, characterized in that the timer is embodied for starting a further time interval at the end of the time interval.

8. The device in accordance with claim 1, characterized in that the sensor unit (2) is embodied as a Hall sensor with corresponding magnets.

9. The device in accordance with claim 8, characterized in that a magnetic wheel is arranged on the driveshaft.

10. The device in accordance with claim 1, characterized in that the drive mechanism (9) includes an electric motor.

11. The device in accordance with claim 1, characterized in that the control and registration device (1) has a computing unit (7), by means of which, based on the number of revolutions of the driveshaft detected during the predetermined time interval, the number of revolutions of the driveshaft for which the drive mechanism (9) is to be activated, can be determined.

12. The device in accordance with claim 1, characterized in that values for the revolutions of the driveshaft can be stored in the at least one comparison arrangement (3, 4), which correspond to the end positions, or predefined intermediate positions of the at least one drawer or one flap.

13. The device in accordance with claim 1, characterized in that a position can be defined as the end position in the closed state of the at least one drawer or one flap in which the driveshaft can be rotated in either direction.

14. The device in accordance with claim 1, characterized in that the timer is embodied not to generate time intervals when the drive mechanism is activated.

15. A method for displacing and/or for opening and closing of at least one drawer or one flap, by means of a motor drive (9) having a sensor unit (2) for detecting the direction of rotation and/or the number of revolutions of a driveshaft, wherein the at least one drawer or one flap is in an active connection with the driveshaft, characterized in that the drive mechanism (9) is activated for opening or closing the at least one drawer or one flap, when the number of the revolutions, or partial revolutions of the driveshaft, not generated by the drive mechanism (9) within the predetermined time interval, exceeds a lower threshold value wherein the drive mechanism (9) is not self-locking.

16. The method in accordance with claim 15, characterized in that an angular velocity is determined on the basis of the revolutions, or partial revolutions, of the driveshaft not generated during the predetermined time interval by the drive mechanism (9), with which the driveshaft of the activated drive mechanism is rotated at the end of the predetermined time interval.

17. The method in accordance with claim 15, characterized in that the number of revolutions of the driveshaft, which was not generated during the predetermined time interval by the drive mechanism (9), is compared with a stored lower threshold value wherein, in case this lower threshold value is downwardly exceeded, the drive mechanism (9) is activated and, for moving the at least one drawer or one flap, the driveshaft is displaced by a number of revolutions, which were not generated during the predetermined time interval by the drive mechanism (9), into its original initial position.

18. The method in accordance with claim 15, characterized in that a change in the direction of rotation, which had taken place during the time interval, is detected.

19. The method in accordance with claim 15, characterized in that by means of the revolutions of the driveshaft detected during the predetermined time interval, the number of revolutions of the driveshaft is calculated, for which the drive mechanism is to be activated.

20. The method in accordance with claim 15, characterized in that the number of revolutions of the driveshaft detected during the predetermined time interval is compared with an upper threshold value.

21. The method in accordance with claim 15, characterized in that a further time interval is started following the end of the predetermined time interval.

* * * * *